United States Patent [19]
Belisle

[11] Patent Number: 5,907,922
[45] Date of Patent: Jun. 1, 1999

[54] TRAP FOR ANIMALS

[76] Inventor: Edouard Belisle, 3269 Chemin du Lac Kiamika, Ste-Veronique, Canada

[21] Appl. No.: 08/681,610

[22] Filed: Jul. 29, 1996

Related U.S. Application Data

[63] Continuation of application No. 08/300,482, Sep. 2, 1994, abandoned.

[51] Int. Cl.⁶ .................................................. A01M 23/34
[52] U.S. Cl. ..................................................... 43/87; 43/88
[58] Field of Search .................................. 43/85, 86, 87, 43/88

[56] References Cited

U.S. PATENT DOCUMENTS

| | | | |
|---|---|---|---|
| 1,012,386 | 12/1911 | Mainland | 43/88 |
| 1,907,360 | 5/1933 | Morrill | 43/87 |
| 1,913,893 | 6/1933 | Morrill | 43/87 |
| 2,083,451 | 6/1937 | Knapp | 43/87 |
| 2,216,927 | 10/1940 | Van Cleve et al. | 43/87 |
| 2,592,390 | 4/1952 | Burt | 43/87 |
| 3,534,493 | 10/1970 | Dahlgren | 43/85 |
| 4,555,863 | 12/1985 | Bouffard | 43/87 |
| 4,578,894 | 4/1986 | Butera | 43/85 |
| 4,581,844 | 4/1986 | Torkko | 43/87 |
| 5,109,627 | 5/1992 | Lee | 43/88 |
| 5,157,863 | 10/1992 | Godwin | 43/87 |

*Primary Examiner*—Kurt Rowan
*Attorney, Agent, or Firm*—Ware, Fressola, Van Der Sluys & Adolphson LLP

[57] ABSTRACT

The trap comprises a frame and a pair of jaws pivotally mounted to the frame. Each jaw may be moved between an opened position and a closed position where the jaws are against the leg of the animal to be caught. The jaws are devoid of teeth or acute portions in order not to wound the caught animal. A lace, provided with a one-way loop and having one end anchored to a tree or a root, is positioned underneath the jaws in order to tighten itself around the leg of the animal. When using the trap, the animal that is caught will try to escape, this will have the effect of moving the trap. However, because the lace is anchored, it will tighten itself on the leg of the animal in order to prevent its escape. The animal may move the trap further and extract his leg from the jaws without injury, but it is still caught by the lace. Thus, this device allows one to catch animals without severely wounding them, as it is the case with usual jaws traps with teeth.

7 Claims, 3 Drawing Sheets

TRAP FOR ANIMALS

This application is a continuation of copending application Ser. No. 08/300,482 filed on Sep. 2, 1994 now abandoned.

TECHNICAL FIELD

The present invention relates to providing an efficient, simple, sturdy and reliable way to catch an animal while minimizing the risks for causing injuries to the animal.

BACKGROUND OF THE INVENTION

Numerous types of traps intended for the catching of animals are known. They consist namely of snares and jaw traps.

Jaws of traps actually known, which are mainly intended for mammals, are generally provided with teeth, or show a more or less sharp section for maintaining firmly one of the legs of the animal. Moreover, the pressure applied by those jaws is always very strong, which has the effect of severely wounding the trapped animal, perhaps even mortality. Snares thrown too quickly may also cause the same results.

These types of traps do not allow one to carry out a selective hunting and animals so trapped cannot be released, the latter having been subjected to wounds that are too serious. Moreover, domestic or protected animals may be accidentally trapped or killed.

DISCLOSURE OF THE INVENTION

The present invention has for an object providing a device for catching an animal which comprises a combination of a classical jaw trap, however devoid of teeth or sharpened portions and not providing a too strong pressure once the jaws are closed, with a lace positioned underneath said jaws. The trap comprises a device for inducing the opening of the jaws whenever the trapped animal moves the trap to thus only keep the lace around one of its legs. This type of trap results in the prevention of the infliction of severe injuries on the trapped animal.

More particularly, the present invention has for an object a device for the catching an animal, the device comprising a frame and a pair of jaws having opposite ends. The jaws are pivotally mounted to the frame. Each of them may be moved between a first position and a second position, the first position being defined when jaws are at a distance from each other and the second position being defined when jaws are against the leg of the animal to be caught.

The device comprises a first means connected to the jaws to bring the latter toward the second position. A second means is provided for retaining at least one of the jaws substantially in the first position. It is also provided with a third means for releasing the jaw or jaws from the second means and allowing the jaws to be brought toward the second position. A lace, having opposite ends, is firmly attached to a sliding means at one of its ends. The sliding means is engaged by an intermediary portion of the lace to form a tightening loop. The other end of the lace is to be fastened to an anchoring mean, the tightening loop being positioned underneath the jaws when the latter are in their first position.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1A:
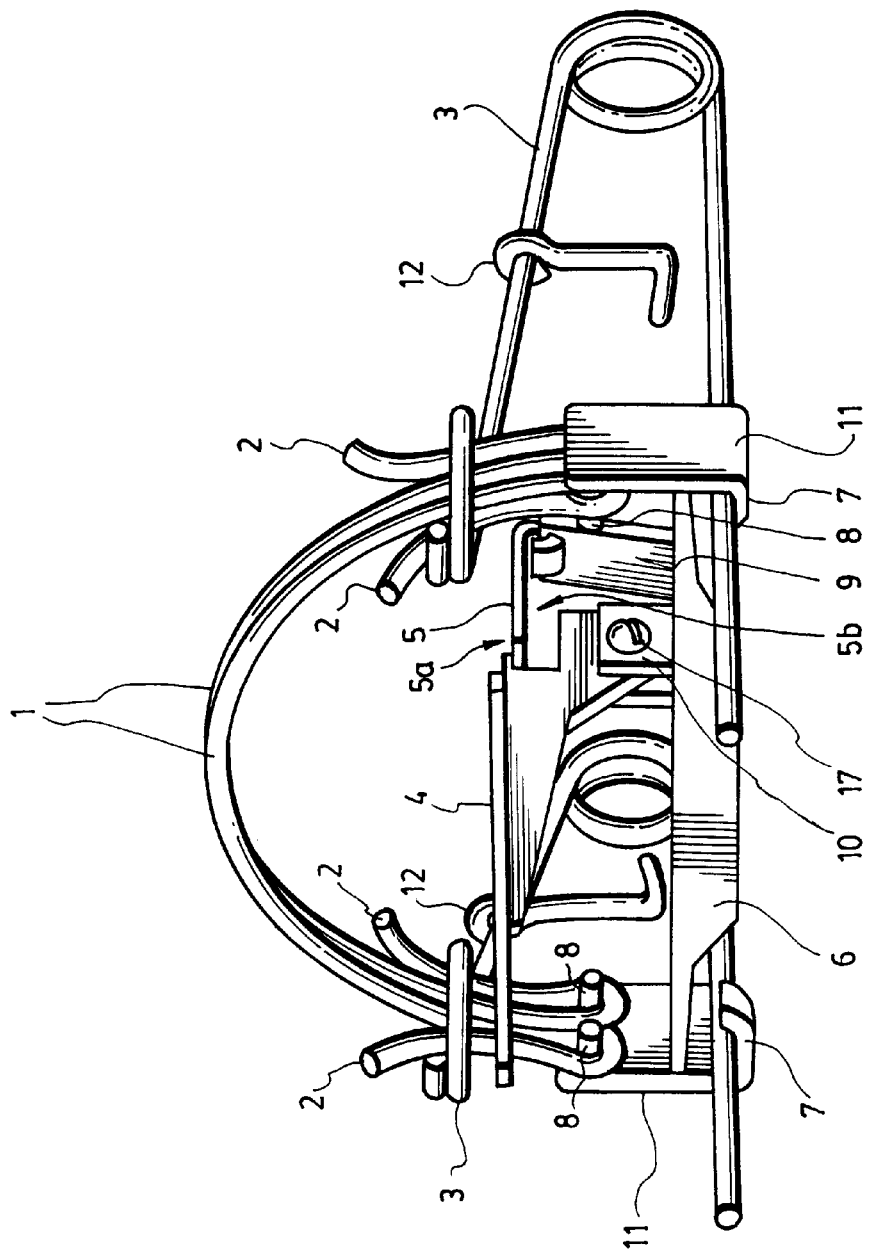
FIG. 1A is a perspective view of a particularly preferred embodiment of the invention, illustrated in a closed position.
Figure 1B:
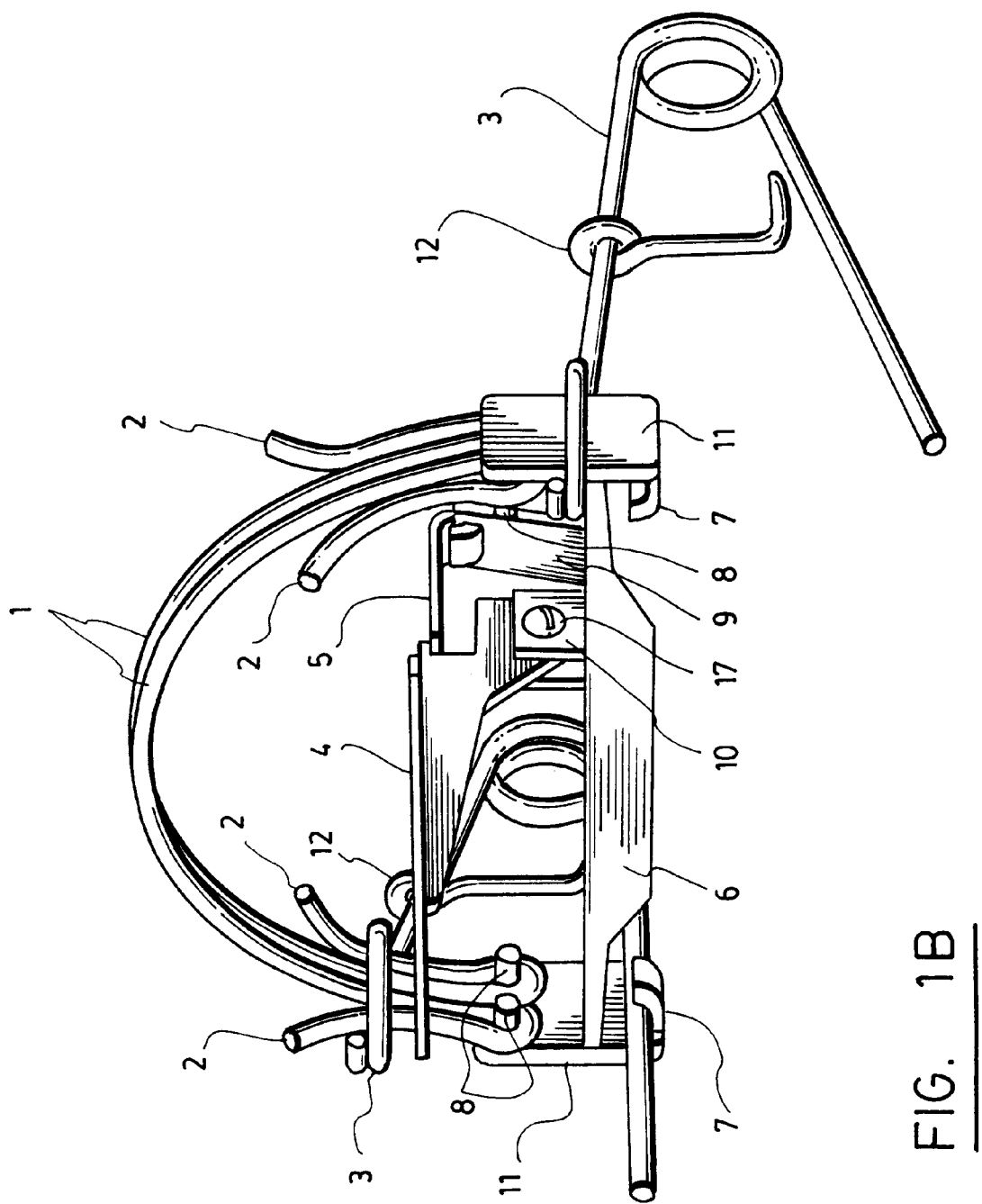
FIG. 1B shows a second position of one of the springs by presenting the second branch of the spring disengaged from the retaining device.
Figure 2:
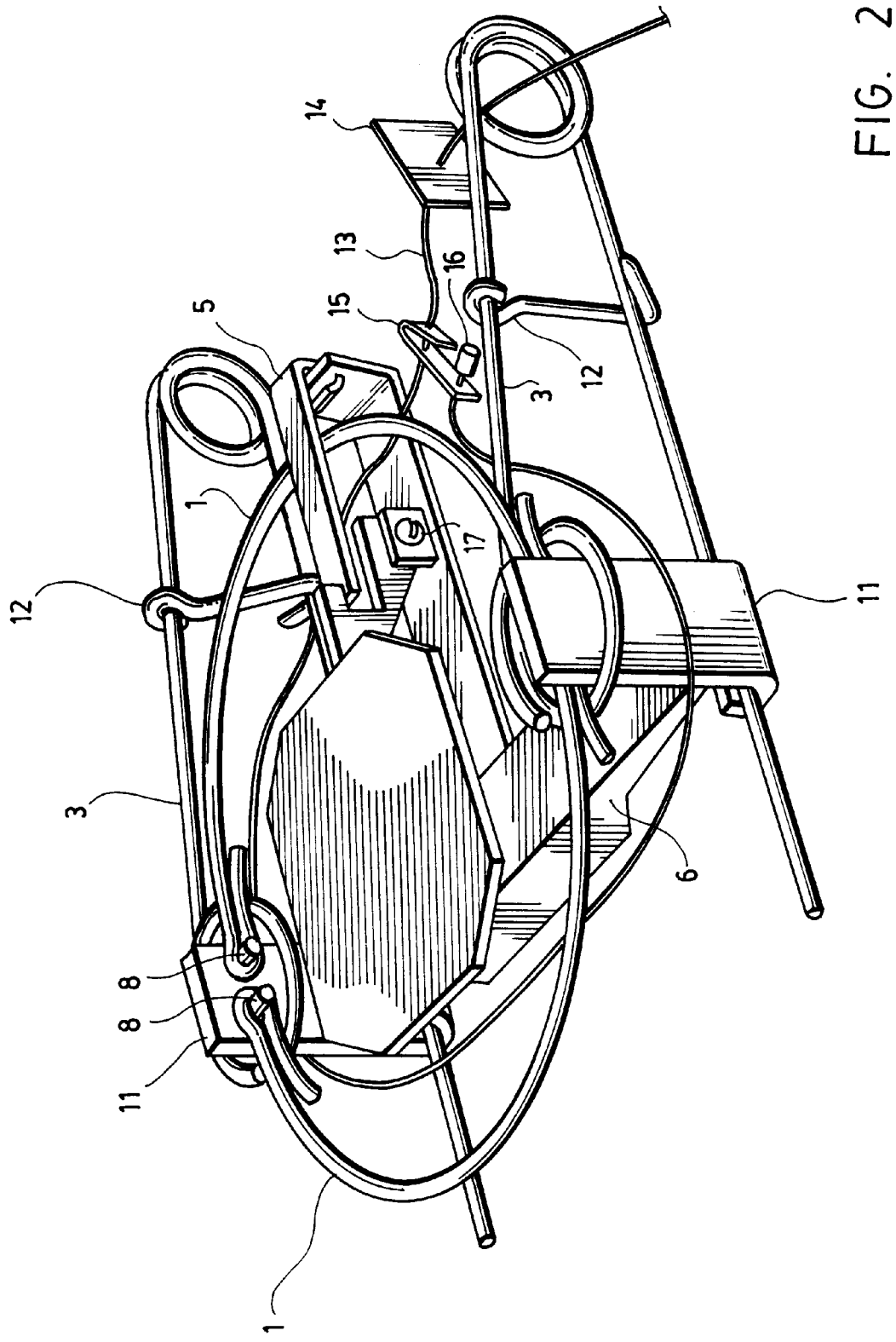
FIG. 2 is a top plan view of the device of the particularly preferred embodiment of FIG. 1, illustrated in an opened position.

As illustrated in FIGS. 1A, 1B, and 2, the trap is a device for the catching of an animal comprising a frame (6) on which is mounted, in a pivoting way, a pair of jaws (1) having opposite ends. Each of the jaws (1) may be moved between a first position and a second position. The first position, illustrated at FIG. 2, is defined when the jaws (1) are at a distance from each other. The second position, illustrated at FIG. 1, is defined when the jaws (1) are one against the other or against the leg of the animal to be caught (not shown).

Preferably, the frame (6) shows a pair of lateral members (11), each provided with at least one pivot (8) for positioning corresponding ends of the jaws (1).

Jaws (1) are preferably of substantially circular section, more particularly in shape of a bow between their pivots (8). The jaws (1) are devoid of teeth or of sharp portions in order not to wound caught animal there between.

A first means, connected to jaws (1), is provided for bringing the latter toward the second position. This first means comprises at least one torsion spring (3) having at least one spiral and two distinct branches. The first branch cooperates with a device to cause the jaws (1) to pivot jointly around pivots (8), this device may comprise fastening levers (2) and cooperates with the springs (3) by the intermediary of a ring in order to force the ends of jaws (1) toward the second position, the second branch of the spring (3) cooperating with a retaining device (7) firmly attached to the frame (6).

A second means is provided for retaining at least one of the jaws (1) substantially in the first position. This means comprises a housing 5b in the frame (6), inside which there is lodged a portion of one of the jaws (1) whenever it is in the first position. The housing is obturated by a trigger (5) pivotally mounted to the frame (6) thanks to a support (9). The trigger (5) may adopt two distinct positions, one of the positions being a closed position obturating the housing and the other being an open position allowing the release of the jaw (1). The trigger (5) is retained in a closed position by a lever (4) pivotally mounted to the frame (6) thanks to a pivot (17) on a support (10), one end of the lever (4) defining a stopper for retaining the trigger (5) in a closed position. When the animal to be caught presses on the lever (4), this latter pivots and frees the trigger (5).

A third means 5a is provided to free the jaw or the jaws from the second means and to allow the jaws (1) to be brought toward the second position, that is against the leg of the animal to be caught.

As illustrated in FIG. 2, the trap comprises a lace (13) one end of which is firmly attached to a sliding means engaged by an intermediary portion of the lace (13) to form a tightening loop. The other end of the lace (13) is to be attached to an anchoring means, as for example a tree and a root. The exact positioning of the lace (13) may vary from one user to another.

When the trap is used, the tightening loop is positioned underneath the jaws (1) when the latter are in their first position, as illustrated in FIG. 2. Preferably, the sliding means comprises a one-way catch (15) provided with a lead stopper (16) in order to maintain a good tightening around the leg of the animal when it tries to disengage itself. Furthermore, the lace (13) is advantageously made of a steel cable slipped in an opening of spirals of one of the springs (3). A retaining plate (14) may then be used to avoid the one-way catch (15) from blocking itself in the opening of the spirals.

According to a preferred embodiment, as more particularly shown in FIG. 1B, the device may also comprise a fourth means to disconnect the first means for the jaws (1) and thus allow to these latter a free displacement between the positions. Preferably, the fourth means comprises, within the retaining device (7) firmly attached to the frame (6), one groove for receiving the second branch of the spring (3). In this embodiment, the first means is preferably in two parts positioned respectively to cooperate with corresponding ends of the jaws (1). Each part of the first means corresponds to a corresponding part of the fourth means.

When using the trap, the animal that is caught will try to escape, this will have for effect to move the trap. However, because the lace (13) is anchored to something that is solid, the lace (13) will tighten on the leg of the animal. Even if the latter achieves an escape from the jaws (1), its leg will be retained by the lace (13). The more the animal tries to free itself, the more firmly the lace (13) will be maintained.

Finally, it is advantageous to provide retaining hooks (12) in order to maintain springs (3) during cocking of the trap and thus facilitate the operation. Hooks (12) are then removed when the trap is ready for use.

Even though a preferred embodiment of the invention has been previously described in detail and illustrated in the annexed drawings, the invention is not limited to the sole embodiment and several changes and modifications may be made to it by a skilled workman without departing from the field or the spirit of the invention.

I claim:

1. Device for catching an animal, the device comprising:
   a frame;
   a pair of laws that are toothless and otherwise without sharp projections injurious to a lea of the animal having opposite ends and Pivotally mounted to the frame, each of the jaws being able to be moved between a first position and a second position, the first position being defined when the jaws are at a distance from each other and the second position being defined when the jaws are against the lea of the animal to be caught;
   a first means connected to the jaws for bringing said jaws toward the second position, wherein the first means comprises at least one torsion spring having at least one spiral and two distinct branches, the first branch for slidably engaging a device for making the jaws jointly pivot toward the second position, the second branch for resting in a retaining device firmly attached to the frame;
   a second means for retaining at least one of the jaws substantially in the first position;
   a third means for freeing the law or the jaws from the second means and to allow the jaws to be brought toward the second position;
   a lace having opposite ends, one of the ends of the lace being firmly attached to a sliding means engaged by an intermediary portion of the lace to form a tightening loop, the other end of the lace for fastening to an anchoring means, the tightening loon being positioned underneath the jaws when said jaws are in their first position, werein the animal with its leg caught between the pair of jaws tightens the lace about its lea by pulling the device away from and against the anchoring means; and
   a fourth means for disconnecting the first means from the jaws and for allowing the jaws a free displacement between the first position and second position, the jaws in the second position permitting withdrawal of the leg after tightening said lace about the leg by the animal pulling further away from and against the anchoring means whereby the leg is withdrawn from the jaws without serious injury and with the lace tightened thereabout;
      wherein the fourth means comprises, within the retaining device firmly attached to the frame, a member defining with the frame a groove for receiving the second branch of the torsion spring, the groove having an opening sufficient to allow a lateral passage of the second branch.

2. Device according to claim 1, wherein the frame includes a pair of lateral members, each provided with at legst one pivot for positioning the corresponding ends of the jaws.

3. Device according to claim 1, wherein the sliding means is a one-way catch.

4. Device according to claim 1, wherein the second means comprises:
   a housing in the frame and inside which is lodged a portion of one of the jaws when it is located in the first position,
   a trigger pivotally mounted to the frame for obturating the housing, the trigger having two distinct positions, a closed position for obturating the housing and an opened position for allowing the relegse of the jaw, and wherein said third means comprises:
      a lever pivotally mounted to the frame for retaining the trigger in a closed position, the lever having opposite ends, one of the ends of the lever defining a stopper for retaining the trigger in its closed position, the other of these ends comprising a lever against which the animal to be caught may act to cause the lever to pivot, move the stopper and free the trigger.

5. Device according to claim 1, wherein the first means is in two spring parts having a first branch disposed for engaging rings slidable on the pair of jaws for opening and closing the pair of jaws, and wherein each part of the first means also has a second branch for engaging a respective part of the fourth means which is fixedly attached to the frame.

6. Device for catching an animal, the device comprising:
   a frame;
   a pair of jaws that are toothless and otherwise without share projections injurious to a leg of the animal having opposite ends and pivotally mounted to the frame, each of the jaws being able to be moved between a first position and a second position, the first position being defined when the jaws are at a distance from each other and the second position being defined when the jaws are against the leg of the animal to be caught;
   a first means connected to the jaws for bringing said jaws toward the second position;
   a second means for retaining at legst one of the jaws substantially in the first position;
   a third means for freeing the jaw or the jaws from the second means and to allow the jaws to be brought toward the second position;

a lace having opposite ends, one of the ends of the lace being firmly attached to a sliding means engaged by an intermediary portion of the lace to form a tightening loop. the other end of the lace for fastening to an anchoring means, the tightening loop being positioned underneath the jaws when said jaws are in their first position, werein the animal with its leg caught between the pair of jaws tightens the lace about its leg by pulling the device away from and against the anchoring means; and a fourth means for disconnecting the first means from the jaws and for allowing the jaws a free displacement between the first position and second position, the jaws in the second position permitting withdrawal of the leg after tightening said lace about the leg by the animal pulling further away from and against the anchoring means to move the frame and disconnect the first means whereby the leg is withdrawn from the jaws without serious injury and with the lace tightened thereabout;

wherein the first means is in two spring parts having a first branch disposed for engaging rings slidable on the pair of jaws for opening and closing the pair of jaws, and wherein each part of the first means also has a second branch for engaging a respective part of the fourth means which is fixedly attached to the frame.

7. Device according to claim 6, wherein the sliding means is a one-way catch.

* * * * *

UNITED STATES PATENT AND TRADEMARK OFFICE
CERTIFICATE OF CORRECTION

PATENT NO. : 5,907,922

DATED : June 1, 1999

INVENTOR(S) : Edouard Belisle

It is certified that error appears in the above-indentified patent and that said Letters Patent is hereby corrected as shown below:

item [57] ABSTRACT, line 18, cancel "jaws" and substitute --jaw--.

At column 2, line 27, cancel "caught animal there between" and substitute --an animal caught therebetween--.

At column 3, line 42, cancel "laws" and substitute --jaws--.

At column 3, line 43, cancel "lea" and substitute --leg--.

At column 3, line 44, cancel "Pivotally" and substitute --pivotally--.

At column 3, line 49, cancel "lea" and substitute --leg--.

At column 3, line 61, cancel "law" and substitute --jaw--.

At column 4, line 1, cancel "loon" and substitute --loop--.

UNITED STATES PATENT AND TRADEMARK OFFICE
CERTIFICATE OF CORRECTION

PATENT NO. : 5,907,922
DATED : June 1, 1999
INVENTOR(S) : Edouard Belisle

It is certified that error appears in the above-indentified patent and that said Letters Patent is hereby corrected as shown below:

At column 4, line 3, cancel "werein" and substitute --wherein--.

At column 4, line 4, cancel "lea" and substitute --leg--.

At column 4, line 23, cancel "legst" and substitute --least--.

At column 4, line 35, cancel "relegse" and substitute --release--.

At column 4, line 53, cancel "share" and substitute --sharp--.

At column 4, line 63, cancel "legst" and substitute --least--.

At column 5, line 4, after "loop", cancel "." and substitute --,--.

At column 5, line 7, cancel "werein" and substitute --wherein--.

Signed and Sealed this

Sixteenth Day of November, 1999

Attest:

Q. TODD DICKINSON

*Attesting Officer*  *Acting Commissioner of Patents and Trademarks*